United States Patent [19]

Miyakawa et al.

[11] Patent Number: 4,783,829
[45] Date of Patent: Nov. 8, 1988

[54] PATTERN RECOGNITION APPARATUS

[75] Inventors: Akira Miyakawa, Yokohama; Seiji Hata, Fujisawa; Yoshie Nishida, Yokohama, all of Japan

[73] Assignee: Hitachi, Ltd., Tokyo, Japan

[21] Appl. No.: 582,555

[22] Filed: Feb. 22, 1984

[30] Foreign Application Priority Data

Feb. 23, 1983 [JP] Japan .................................. 58-27518
Feb. 23, 1983 [JP] Japan .................................. 58-27519

[51] Int. Cl.$^4$ ................................................. G06K 9/08
[52] U.S. Cl. ......................................... 382/22; 382/25; 382/30; 382/56
[58] Field of Search ................. 382/22, 16, 25, 30, 382/34, 41, 44, 56; 358/260

[56] References Cited

U.S. PATENT DOCUMENTS

| | | | |
|---|---|---|---|
| 2,968,789 | 1/1961 | Weiss et al. | 382/25 |
| 3,614,736 | 10/1971 | McLaughlin | 382/30 |
| 4,199,815 | 4/1980 | Kyte et al. | 382/56 |
| 4,272,756 | 6/1981 | Kakumoto et al. | 382/44 |
| 4,375,654 | 3/1983 | Evans et al. | 358/260 |
| 4,499,597 | 2/1985 | Alves | 382/41 |
| 4,566,124 | 1/1986 | Yamamoto et al. | 382/22 |
| 4,712,248 | 12/1987 | Hongo | 382/22 |

OTHER PUBLICATIONS

Pavlidis et al., "Computer Recognition of Handwritten Numerals by Polygonal Approximations" *IEEE Transactions on Systems, Man, and Cybernetics,* vol. SMC-5, #6, Nov. 1975, pp. 610-614.

Wong et al., "Scene Matching with Invariant Moments", *Computer Graphics and Image Processing,* #8, 1978, pp. 16-24.

*Primary Examiner*—Leo H. Boudreau
*Assistant Examiner*—Joseph Mancuso
*Attorney, Agent, or Firm*—Fay, Sharpe, Beall, Fagan, Minnich & McKee

[57] ABSTRACT

A pattern recognition apparatus for recognizing a pattern derived from image data of an outline of an object region is disclosed. The apparatus comprises means for identifying the object region from the input image data, means for extracting outline pixels of the object region, means for polygon-approximating the object region based on a position relationship among the outline pixels to determine vertex coordinates of the approximation polygon, means for determining characteristic data representing a position and an attitude of the region based on the vertex coordinates, and means for superimposing the polygon-approximated object region pattern on a dictionary pattern based on the characteristic data and, determining a common region of the patterns to determine the identity of the patterns. High speed and highly reliable pattern matching is attained.

26 Claims, 14 Drawing Sheets

| 301 | 302 | 303 | 304 | |
|---|---|---|---|---|
| REGION LABEL NO. | UPPER LEVEL REGION NO. | AREA | REGION REPRESENTATIVE POINT ADDRESS | |
| | | | X | Y |

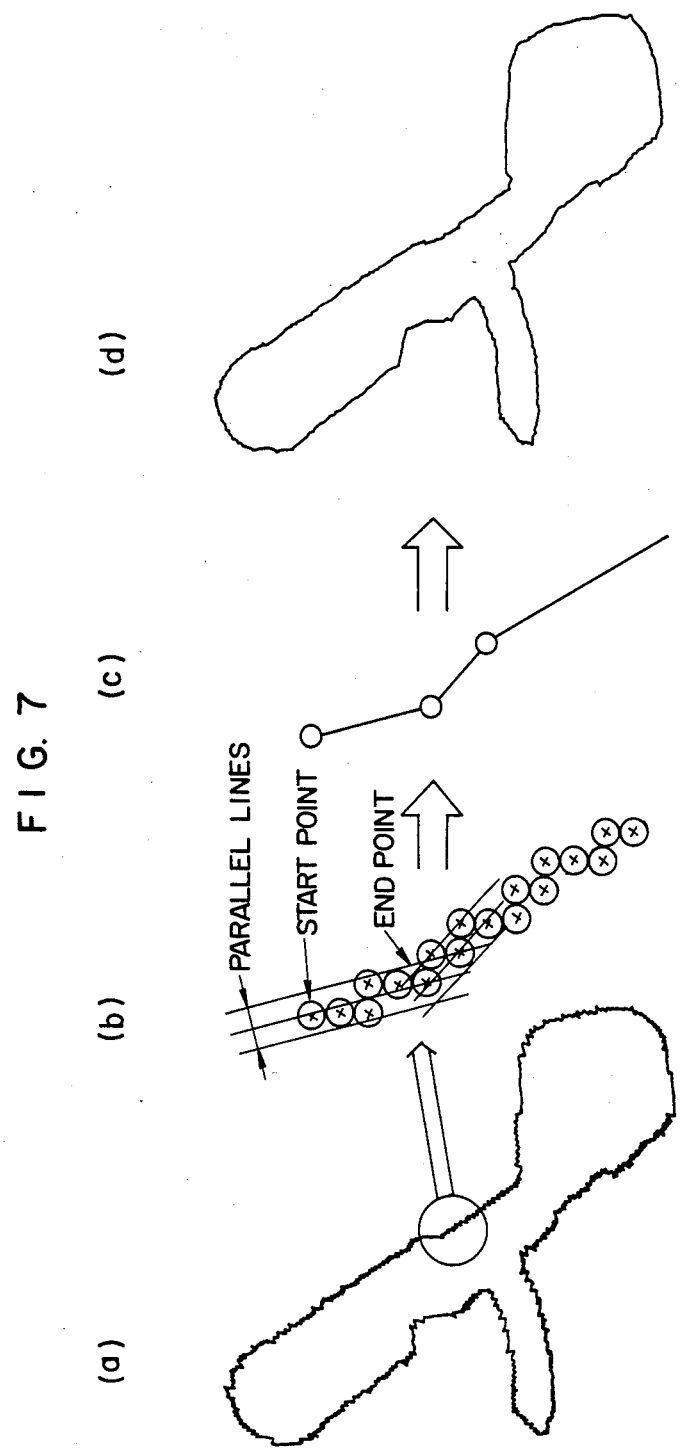

FIG. 9a

| IA1 | IP1 | IA2 | IP2 | IA3 | IP3 | IA4 | IP4 |

FIG. 9b

| SA1 | SP1 | SA2 | SP2 | SA3 | SP3 | SA4 | SP4 |

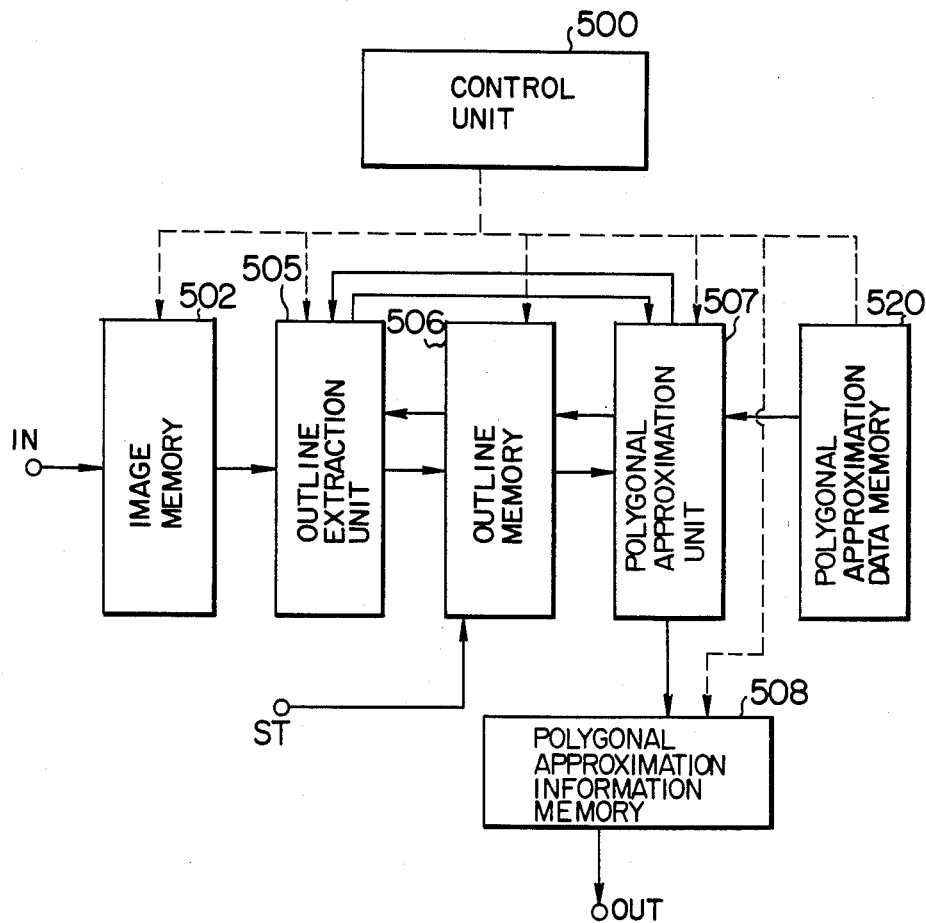

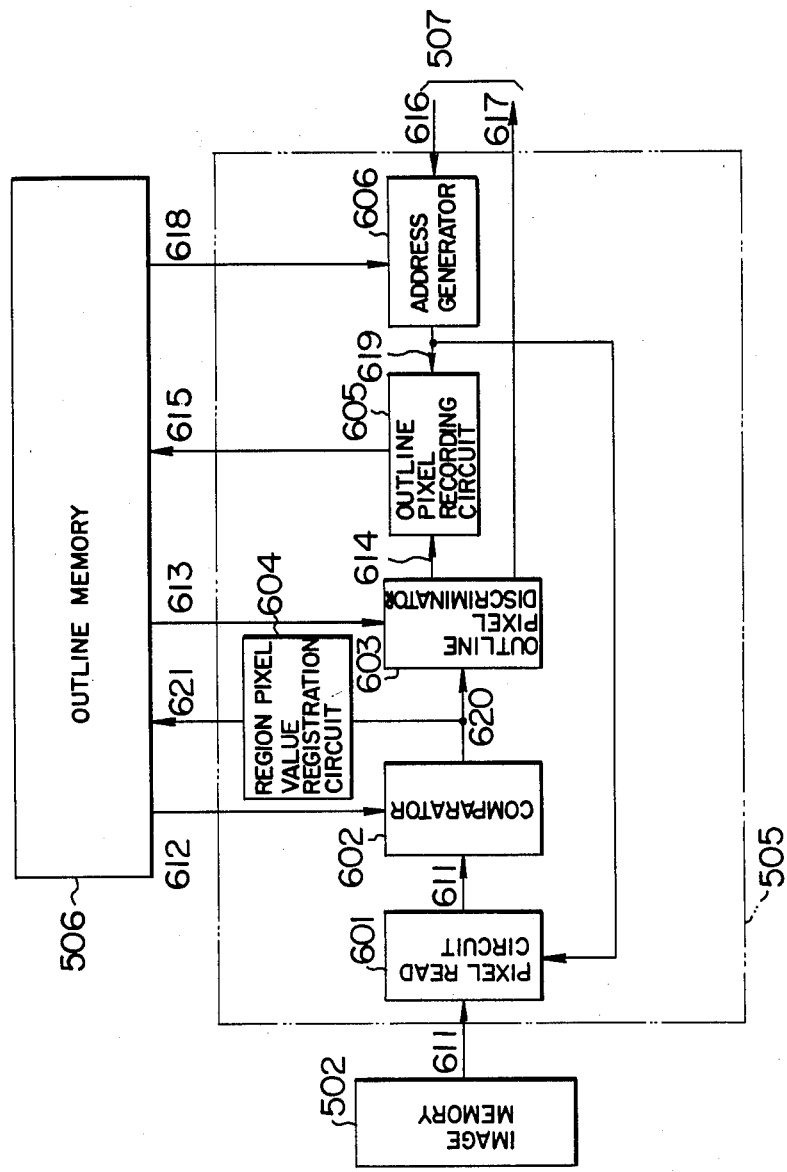

PATTERN RECOGNITION APPARATUS

BACKGROUND OF THE INVENTION

1. Field of the Invention

The present invention relates to an object recognition apparatus, and more particularly to a pattern recognition apparatus which segmentally approximates a pattern derived from an image data of an outline of an object region to recognize the pattern.

2. Description of the Prior Art

One of prior art, object recognition apparatus which have been put into practice classifies an object region into groups of same density pixels based on binary images of the object and recognizes the object based on external shape characteristics such as an area of the region, a center of gravity, a maximum dimension from the center of gravity, a minimum dimension from the center of gravity and a peripheral length.

Such an apparatus is effective to recognize the object when characteristics which are significantly different among the objects to be recognized can be selectively used, and can attain a high speed recognition. However, when objects such as keys which are different in a limited portion of the shape and identical in most portions of the shape are to be recognized, it is difficult to find out characteristics which allow effective classification of those objects or it is necessary to combine many characteristics to recognize the objects. Accordingly, the above apparatus is not effective to recognize similar objects.

On the other hand, in a pattern matching method, a partial pattern (for example, a 12×12 pixel pattern) of an object pixel pattern which most appropriately represents a characteristic of the object is stored as a dictionary pattern, and the dictionary pattern is superimposed on an input image and it is shifted pixel by pixel to find out an optimal matching position to recognize the object.

Since this method examines the degree of matching by superimposing the pattern, it is strong against a small noise and has a sufficient recognition ability to analogous patterns. However, the object to be recognized must have the same attitude as that of the previously stored dictionary pattern and hence this method cannot recognize an object with an arbitrary rotation.

One approach to resolve the above problem is a polar coordinates matching method. In this method, a center of gravity of an object region is determined, a pattern of a region boundary of the object is represented by a polar curve $(r-\theta)$ with an origin of the polar coordinate being at the center of gravity and it is superimposed on a predetermined dictionary $(r-\theta)$ curve and it is rotated slightly at a time to find out a most matching position.

This method can recognize an object of an arbitrary rotation, but since the preparation of the $r-\theta$ curve needs much processing, the amount of processing increases when a high precision recognition of analogous objects is required.

SUMMARY OF THE INVENTION

It is an object of the present invention to provide a pattern recognition apparatus having a high processing speed which maintains an increase in the amount of pattern matching process even when an outline of an object is accompanied by an attitude rotation.

It is another object of the present invention to provide a pattern recognition apparatus which improves reliability and a precision of a pattern recognition.

It is other object of the present invention to provide a pattern recognition apparatus which can perform a line segment approximation processing at high speed.

The pattern recognition apparatus of the present invention comprises means for recognizing an object region based on an input image data, means for sequentially scanning outline pixels of the object region to extract the outline pixels, means for effecting a polygon approximation on the object region based on positional relation of the outline pixels to determine vertex coordinates of the polygon, means for extracting region characteristic data from the vertex coordinates, and means for superimposing the pattern of the polygon-approximated object region on a predetermined dictionary pattern to extract a common region to determine matching of those patterns. To explain more specifically, in the prior art pattern matching method in which binary (or multivalued) patterns are matched to recognize an object by the presence of an object pattern which matches to a dictionary pattern within an allowable error, the matching is determined pixel by pixel. Accordingly, this method cannot match the pattern with an attitude rotation.

To resolve the above problem, internal and external outlines of the pattern are approximated by line segments to represent the attitude rotation of the pattern by the vertex coordinates of polygons which are segmented pattern.

The polygon-approximated patterns are then matched to determine a product pattern (common region) of the polygons represented by the vertex data instead of by the pixel-by-pixel matching process and the matching of the patterns is detected when a ratio of an area of the product pattern to an area of the original pattern is larger than a predetermined value.

Since the pattern is represented by the segments during the pattern matching process, pattern region information for a large amount of image data can be highly compacted and the rotational pattern matching can be performed at a high speed because the attitude rotation of the pattern is carried out by transforming the vertex coordinates of the polygon. Since the segmenting process may readily cause an error because of variation of start point of polygonal approximation, the decision step by the area of the common region is included in the pattern matching process to improve the reliability of the recognition.

BRIEF DESCRIPTION OF THE DRAWINGS

FIG. 7a–d illustrates a polygonal approximation.

FIGS. 9a and b shows a format of a polygon-approximated data.

FIG. 10 is a block diagram of an outline extraction and polygonal approximation unit.

FIG. 11 is a block diagram of an outline extraction unit.

DESCRIPTION OF THE PREFERRED EMBODIMENTS

Embodiments of the present invention will be explained for a general operation and flows of preprocessing, outline extraction processing, polygonal approximation processing, region characterizing processing and pattern matching processing.

Figure 1:
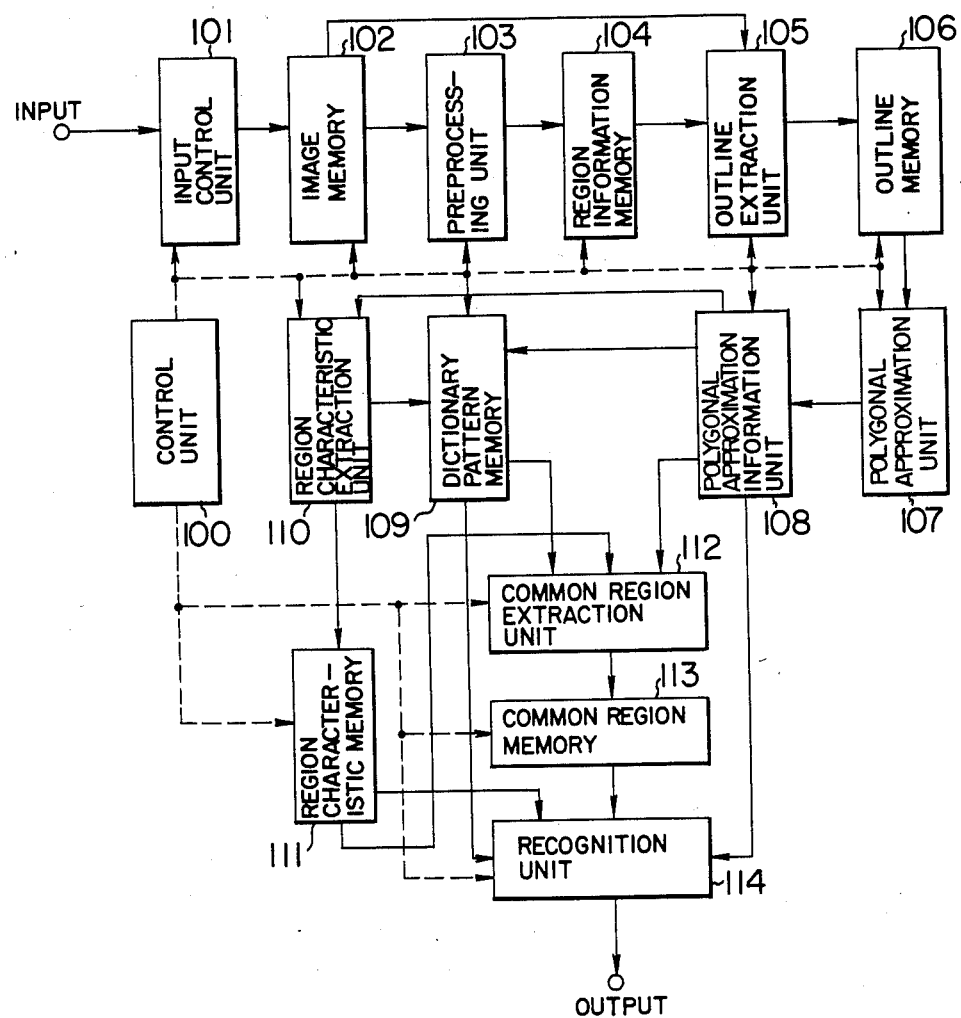
FIG. 1 is a block diagram of one embodiment of a pattern recognition apparatus of the present invention

FIG. 1 is a block diagram of one embodiment of a pattern matching apparatus of the present invention. Numeral 100 denotes a control unit for controlling flows of processings to units described below, 101-104 units of preprocessing means, 101 an input control unit, 102 an image memory, 103 a preprocessing unit, 104 a region information memory, 105 and 106 units of outline extraction means, 105 an outline extraction unit, 106 an outline memory, 107-109 units of polygonal approximation means, 107 a polygonal approximation unit, 108 a polygonal approximation information memory, 109 a dictionary pattern memory, 110 and 111 units of region characteristic extraction means, 110 a region characteristic extraction unit, 111 a region characteristic memory, 112-114 units of pattern matching means, 112 a common region extraction unit, 113 a common region memory, and 114 a recognition unit.

An input image data is digitized and binarized by a predetermined threshold level by the input control unit 101 and it is supplied to and stored in the image memory 102 as a binary gray scale image data.

The image data stored in the memory 102 is processed by the preprocessing unit 103 to determine a region of the image to be recognized and position information on representative points of the region is stored in the region information memory 104.

The outline extraction unit 105 determines a start point of search based on the position information of the representative points, sequentially searches outline pixels of the specified region of the image and stores center coordinates of the region in the outline memory 106.

The polygonal approximation unit 107 approximates the points representing the center of the outline pixels by segments within a predetermined allowable error based on the center coordinates and sequentially stores end points of the segments, that is, vertex coordinates of a polygon approximated to the region in the polygonal approximation information memory 108. When a dictionary pattern is registered, the polygonal approximation information is transferred to the dictionary pattern memory 109.

The region characteristic extraction unit 110 determines characteristics of the specified region (for example, area, center of gravity, moment principal axis, maximum length and peripheral length) based on the content of the polygonal approximation information memory 108 and stores them in the region characteristic memory 111. When the dictionary pattern is registered, the characteristic information is stored in the dictionary pattern memory 109.

The common region extraction unit 112 transforms the coordinates of the input pattern such that the characteristics of the current input pattern (stored in the polygonal approximation information memory 108) and the dictionary pattern (stored in the dictionary pattern memory 109) match to each other (for example, the center of gravity coordinates coincide or the moment principal axis directions match), represents a common region (product pattern) of the both patterns as vertex points and stores them in the common region memory 113.

Finally, the recognition unit 114 calculates an area of the common region (product pattern), calculates a ratio of the area of the common region to an area of the dictionary pattern or the input pattern, and if the ratio is larger than a predetermined value, it determines that both patterns match and produces a recognition signal. If both patterns do not match and more than one dictionary patterns are included, the matching process for the second and third dictionary patterns are repeated. The recognition unit 114 also produces the position information and the attitude information of the input pattern based on the relative position of the coincident patterns before the transform.

A flow of recognition steps performed by the present apparatus is now explained.

Figure 2:
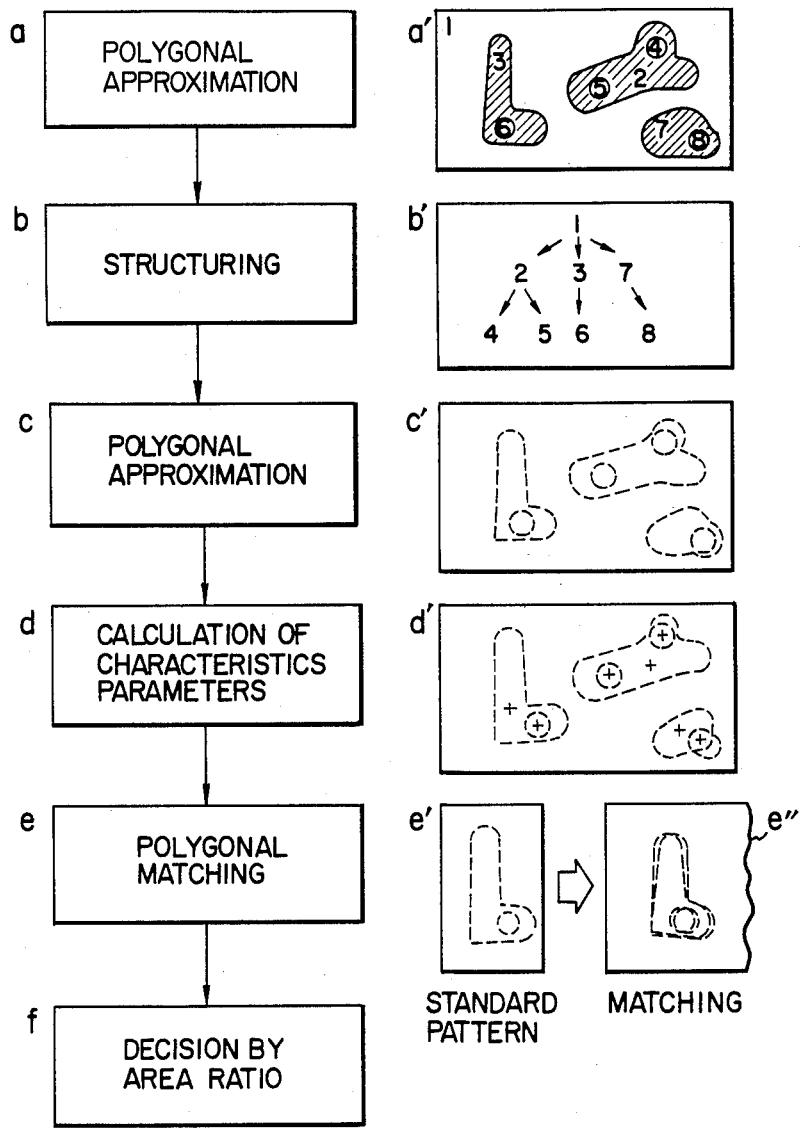
FIG. 2 illustrates steps of segmented pattern matching in accordance with the present invention.

FIG. 2 shows a diagram of one application of the polygon based pattern recognition method. It is called the polygonal pattern matching method. The major characteristic of this method is its ability to recognize an object regardless of its orientation. The processing steps of the method are listed below:

(a) Segmentation (labeling): recognition of blobs of the same value, starting points of the contour, and relations between blobs by four directional connectivity analysis method. (FIGS. 2a and 2a')

(b) Structuring: analization of inside-outside relations between blobs and the expression of these relations by the tree structure. (FIGS. 2b and 2b')

(c) Polygonal approximation: expressions of the blobs' contour by segmented lines according to a look-up table which describes the potential mesh patterns to be transformed to a line. (FIGS. 2c and 2c')

(d) Calculation of characteristic parameters: calculation of the X-Y coordinate of the center of the object, the direction of the major axis of the second moment. (FIGS. 2d and 2d')

(e) Polygonal matching: placement of the target pattern onto the standard pattern and generation of the overlapped polygon. (FIGS. 2e, 2e' and 2e")

(f) Decision by area ratio: identification of a part and its position and orientation by the ratio of the overlapped area to an initial area. (FIG. 2f)

The preprocessing is now explained with reference to a preprocessing flow chart shown in FIG. 3 and a format of the region information shown in FIG. 4.

The preprocessing is performed by the input conrol unit 101-through the region information memory 104. Gray scales ("0" and "1" for the binary image) of the pixels are sequentially examined and each group of pixels having the same gray scale is extracted as one region, and the respective regions are signified (to determine candidates of object region and hole region) based on an inclusion relationship among the regions to prepare data tables of labels, representative coordinates, areas and inclusion relationships of the respective regions. This process plays a role of extracting the object from the image.

Figure 3:
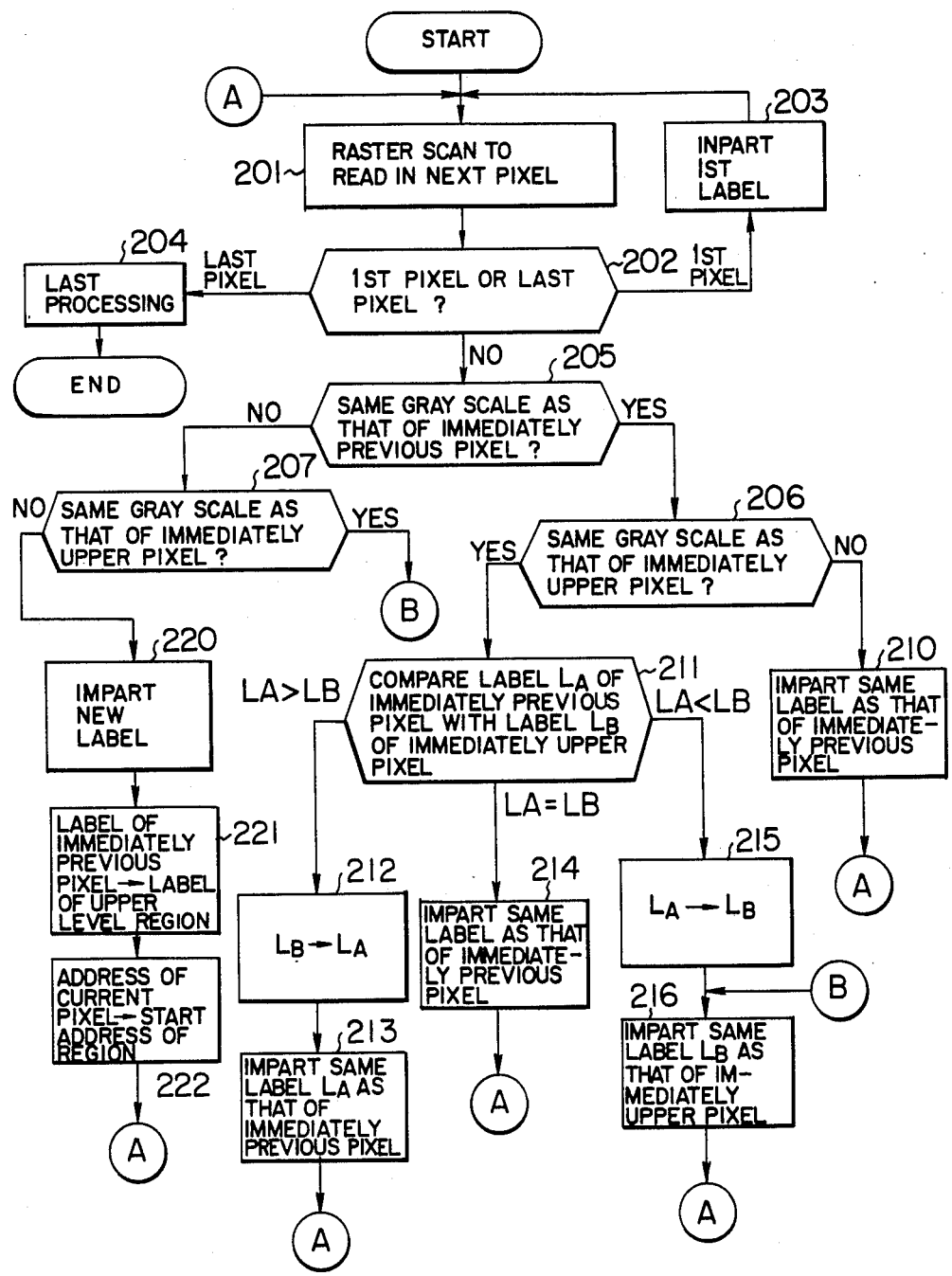
FIG. 3 is a flow chart showing an example of steps of pre-processing.

In a typical process shown in FIG. 3, the pixels are raster-scanned starting from a left-top pixel of the image (201-204), connectivity of the pixels of the same gray scale is analyzed (205-207), the same label is imparted to the pixels of the same gray scale to be connected (210-216), and each group of the pixels of the same label is regarded as a region.

Different labels are imparted to the respective regions (220) and one of them which has a maximum area and adjoins to a periphery of the image is identified as a background region. A region which adjoins a boundary of the background region, is included therein and has an area within a predetermined limit is selected as a candidate of the object to be recognized. A region included in the candidate object region is selected as a candidate of a hole region.

A start address of each region is an address of a pixel which is first detected when the image is rasterscanned (222). The address is registered as region representative point coordinates, a format of a region information table is shown in FIG. 4, in which numeral 301 denotes a field in which a region label number is stored, 302 a field in which a label of an immediately previous pixel is stored as an upper level region label, 303 a field in which areas of regions of the respective labels are stored and 304 a field in which start addresses of the respective regions are stored as coordinates (X.Y) of representative points.

The outliee extraction is performed by the outline extraction unit 105 and the outline memory 106. Two-dimensionally arranged region information is represented by the outline coordinates to compress the information. Any one of several known methods may be used.

The processing is started from the region representative point and the adjacent pixels on the region boundary are sequentially examined in accordance with 4-adjacent or 8-adjacent until the region has been circulated. The output is a sequence of outline pixel coordinates.

The sequence of outline coordinates of the object region is approximated by segments within a predetermined approximation error to further compress the information.

The polygonal approximation is performed by the polygonal approximation unit 107 and the segmentation information memory 108. The output is a sequence of coordinates of the opposite ends of the line segments. It is a sequence of vertices of a polygon approximated to the region. Any polygonal approximation method may be used. One example which meets a high speed requirement is explained below.

In polygonal approximation process of the sequence of points, a maximum approximation error e max is first set and a position and a direction of parallel lines having a distance therebetween determined by the error s max are determined such that as many points as possible are included in the area of the parallel lines, and an approximation segment is determined based on a center line of the parallel lines.

A concurrence of the input point (output of the outline extraction unit) is represented by A and the approximation segment is represented by B (concurrence of points on the segment) a Hansdorff-Euclidean distance H (A, B) between A and B is represented by $$H(A,B) = \max\left[\max_{P_1 \in B} \min_{P_2 \in A} \| P_1 - P_2 \|, \max_{P_1 \in A} \min_{P_2 \in B} \| P_1 - P_2 \| \right]$$

where $\| P_1 - P_2 \|$ is an Euclidean distance between points $P_1$ and $P_2$.

Accordingly, the above polygonal approximation processing performs the polygonal approximation to meet H (A,B)≦εmax, where s max is the maximum (predetermined) approximation error, and it is a polygonal approximation method to minimize an accumulation of squares of errors.

In actual, the above approximation processing is not exactly carried out due to the amount of calculation but an approximation method in which an end point of an approximation segment is searched from the sequence of input points (shown in FIG. 5) or the error is determined only by an error in a y-direction in accordance with the Hansdorff-Euclidean distance described above alternatively, the approximation segment may be determined by searching a shortest path in a band-shaped region defined by the sequence of outline pixels (with each pixel having a square region).

The polygonal approximation processing is specifically explained with reference to a polygonal approximation flow chart shown in FIG. 5, an illustration of the polygonal approximation shown in FIG. 6 and steps of polygonal approximation shown in FIG. 7.

Figure 5:
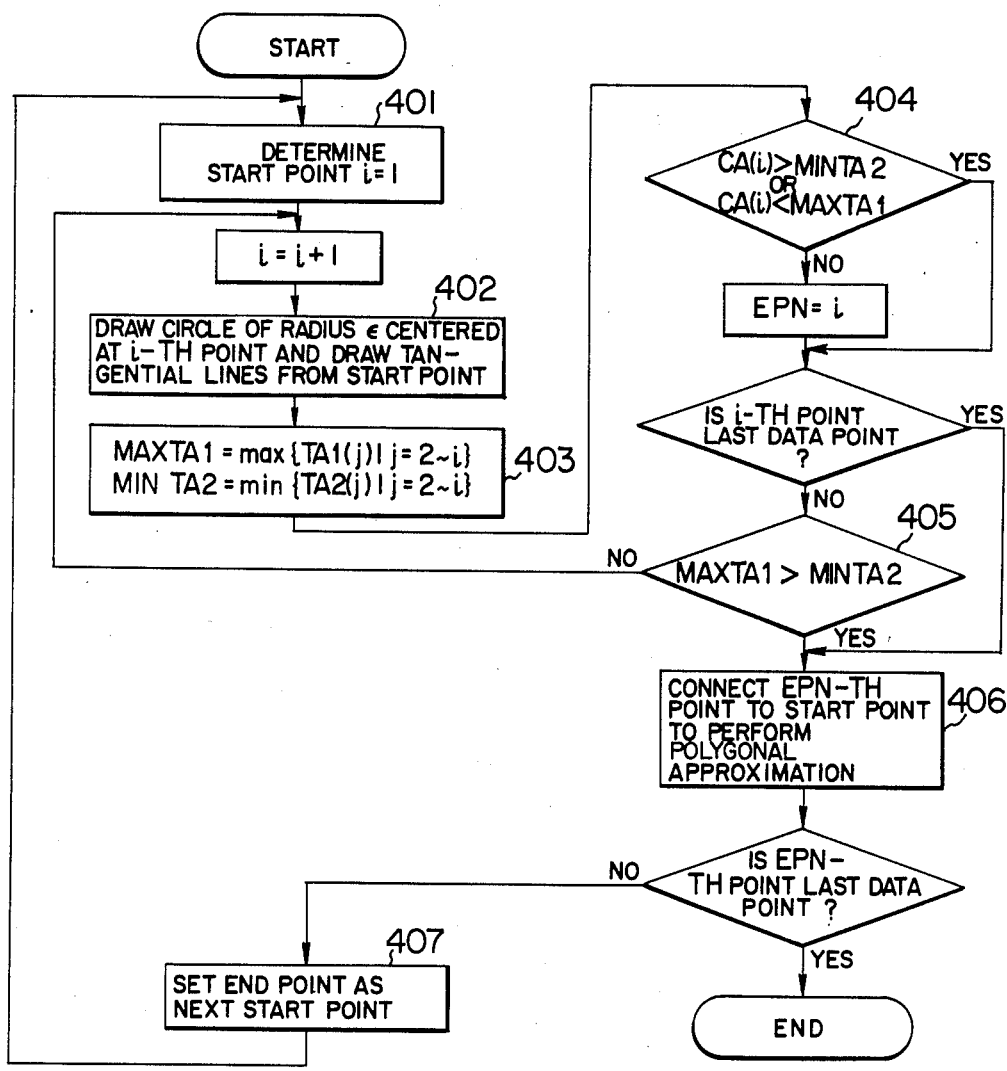
FIG. 5 is a flow chart showing an example of steps of polygonal approximation processing.

Referring to FIG. 5, one of the outline points is selected as a start point for the approximation processing and it is registered as a first approximation segment vertex (401).

Figures 4, 6:
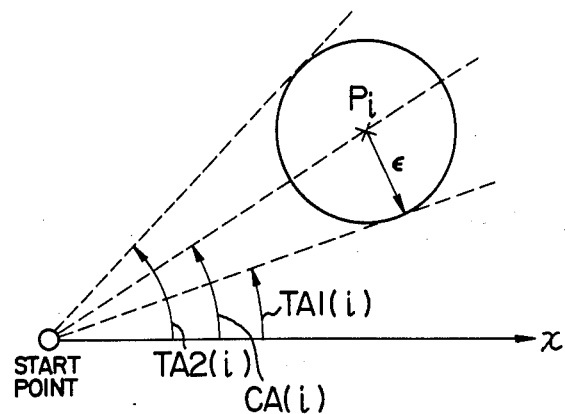
FIG. 4 shows a format of region information in the pre-processing.
FIG. 6 illustrates a polygonal approximation

Then, a circle having a radius ε centered at the next outline point $P_1$ is drawn as shown in FIG. 6 and an upper tangential angle TA2 and a lower tangential angle TA1 from the start point are determined (402). Similarly, circles having the radius ε centered at the sequential outline points are drawn as shown in FIG. 7b and tangential lines are drawn. A maximum one of TA1 is set as MAXTA1 and a minimum one of TA2 is set as MINTA2 (403).

If MAXTA1>MINTA2 is met, the polygonal approximation can no longer be performed (405) and an EPN-th point is registered as an end point (406).

Tangential lines are drawn from the candidate end point to update MAXTA1 and MINTA2 to check if CA's of the respective points are between MAXTA1 and MINTA2. If they are, the point is selected as a candidate point (404). If the EPN-th point is not the last data point, the polygonal approximation processing is continued starting from that point (407).

In this manner, the outine of the binary image shown in FIG. 7a is transformed to a approximated outline shown in FIG. 7d through steps of FIGS. 7b and 7c.

Another embodiment for increasing the outline extraction processing and the polygonal approximation processing is now explained.

The polygonal approximation of the sequence of pixels means to segment representative points of the pixels which are center points of the pixels. Each pixel represents one of fine square sections of the image and the array of the center points of the respective pixels has points arranged at an equal pitch both horizontally and vertically.

Figure 8A:
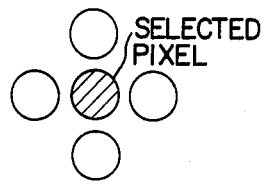
FIGS. 8a and b illustrate a relationship of neighbourhood pixels to a specified pixel.
Figure 8B:

Assuming that sequences of points which meet 4-adjacent and 8-adjacent between selected pixels and neighbourhood pixels as shown in FIGS. 8a and 8b, respectively, are segmentally approximated, the number of connecting patterns of the points which are subject of the polygonal approximation is definite if a maximum length of the segment is limited.

In the present embodiment, all possible point patterns are stored in a data table and the data table is looked up in the polygonal approximation processing instead of calculating the approximation error for each point to increase the processing speed.

The look-up address (relative address) data is also stored in the data table so that the next outline pixel is quickly determined when the outline of the selected region on the image is looked up. Thus, the outline approximation processing speed is further increased.

FIG. 9 shows formats of the polygonal approximation data in the present embodiment.

The polygonal approximation data comprises first and second data having formats shown in FIGS. 9a and 9b.

The first data is explained below. In the polygonal approximation processing, a position of a second pixel relative to a first pixel is up, right, down or left position. The data for those four patterns are arranged in such a sequence that the second pixel is scanned clockwise around the first pixel. Each pattern data includes two items. For example, IA1 represents a relative address on the image memory of the second pixel (located immediately above the first pixel) relative to the first pixel, and IP1 represents a start address of a field in which data for the polygonal approximation for the third pixel is stored. It, therefore, represents a start address of the second data.

The second data are prepared one for each of the third and subsequent outline pixels in the polygonal approximation processing. For example, a data for the L-th outline pixel in the approximation processing is explained. SA1 represents a relative address of a candidate pixel of the L-th outline pixel to the (L−1)th outline pixel on the image memory. The candidate pixel is checked in accordance with the address SA1, and if it is not the outline pixel, similar checks are done for SA2, SA3 and SA4. If the pixel specified by the address SA3 is determined as the outline pixel, SP3 represents the approximation information of the L-th outline pixel.

When SP3 represents a pointer to the first data, it means that the approximation is no longer possible if the L-th pixel is included, and indicates to perform the polygonal approximation processing for the pixels up to the L-th pixel. When SP3 represents a pointer to the second data, it means that the approximation is possible even if the current L-th pixel is included, and it indicates to continue the search for the (L+1)th outline pixel by using the data pointed by the pointer.

The second data thus includes four sets of search address data for the four directions and approximation discrimination data (which include pointers to the next data to be processed) as one unit to allow the clockwise circulating search.

All possible patterns of the first and second data in the two formats are stored in the data file. The sequence of the arrangement of the four-direction data sets in each data unit is selected such that the number of searches is minimized while the rule of clockwise search is maintained.

The present embodiment is now explained with reference to the drawings.

Figure 12:
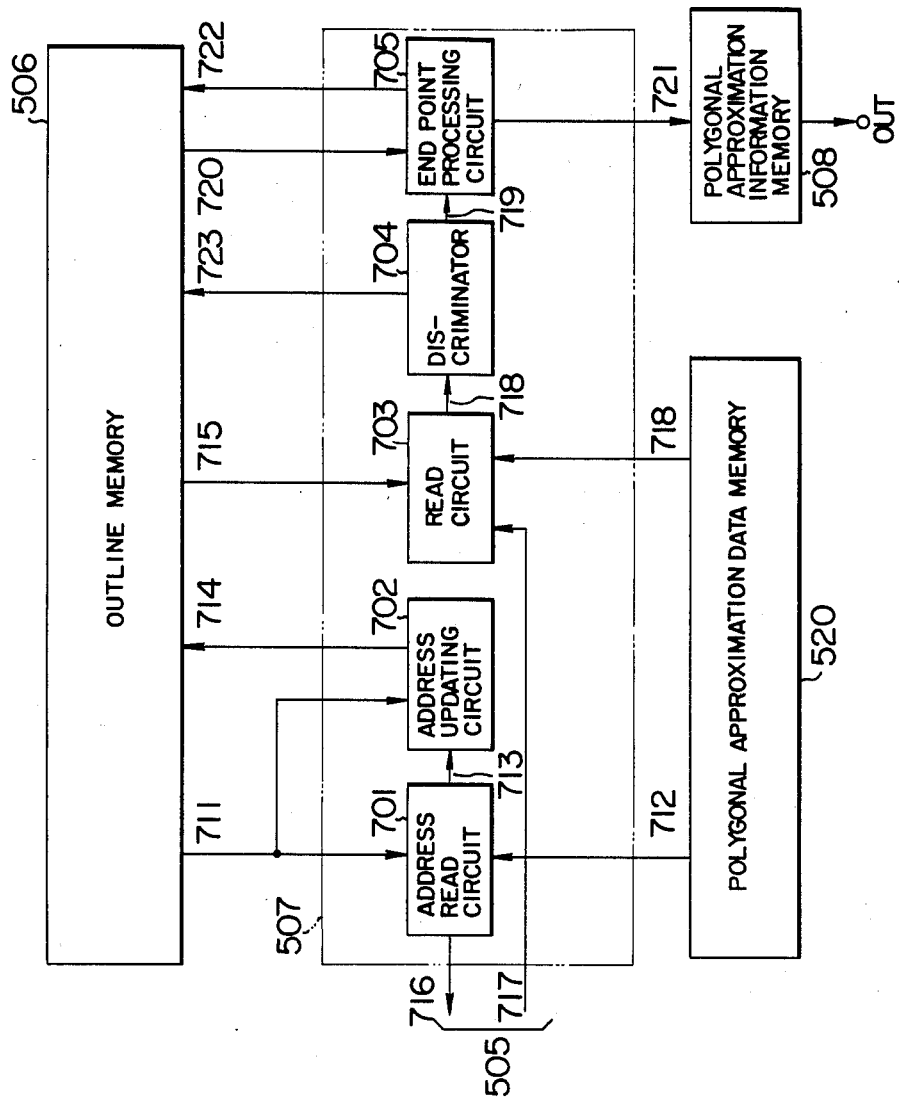
FIG. 12 is a block diagram of a polygonal approximation unit.

FIG. 10 shows a block diagram of the outline extraction unit and the polygonal approximation unit in the present embodiment, FIG. 11 shows a block diagram of the outline extraction unit and FIG. 12 shows a block diagram of the polygonal approximation unit.

Numeral 500 denotes a control unit for controlling flows of the processinss of the units described below and it corresponds to the control unit 100 in FIG. 1. Numerals 502 and 505–508 denotes an image memory, an outline extraction unit, an outline memory, a polygonal approximation and a polygonal approximation information memory, which correspond to 102 and 105–108 of FIG. 1, respectively numeral 520 denotes a polygonally approximation memory which stores polygonal approximation data for the point patterns required to polygonapproximate the outline pixels of the desired digital image. Numeral 601 in the outline extraction unit, 505 denotes a pixel read circuit, 602 a comparator, 603 an outline pixel discriminator, 604 a discrimination value registration circuit, 605 an outline pixel recording circuit, and 606 a pixel read address generator. In the polygonal approximation unit 507 of the approximation means, numeral 701 denotes an outline search address read circuit, 702 an address updating circuit, 703 a polygonal approximation data read circuit, 704 a discriminator, and 705 an end point processing circuit.

Referring to FIG. 10, the processing and the operation of the overall system are explained.

The digital image from an input terminal IN is stored in the image memory 502.

The polygonal approximation data of FIG. 9 is previously stored in the polygonal approximation data memory 520.

When the information ST which indicates the object outline region to be processed in the image is applied to the outline memory 506, the processing of the system is initiated. The information ST for indicating the region may indicate the address of the pixel which is first detected when the regions on the image are raster-scanned from the left top end, as a region representative point. Such region representative point information may be supplied from the region information memory 104 shown in FIG. 1. The region representative point is selected as a start point to track the outline and it is also an end point after the periphery of the region has been circulated. A threshold for discriminating the object region from other regions is also stored in the outline memory 506.

The outline extraction unit 505 reads in the pixel at the region representative point from the image memory 502 and determines whether the pixels in the object region are larger or smaller than the threshold, and stores the results in the outline memory 506.

A candidate pixel of the next outline pixel adjacent to the current outline pixel (representative point pixel) is selected and it is compared with the threshold to determine whether it is a pixel in the object region. In selecting the candidate of the outline pixel, four pixels which are upward, downward, leftward and rightward of the current outline pixel are objects if a 4-adjacent (4-neighbors) is used as a reference of connection. If an 8-adjacent is used, eight peripheral pixels are objects.

Those pixels are sequentially selected as the candidate with the immediately previous outline pixel being the start point, starting from the next pixel. If the selected candidate pixel is not the pixel in the region, the next candidate is selected.

The selection is done by the polygonal approximation unit 507 by reading the next search address (relative address) from the polygonal approximation data memory 520 and supplying it to the outline extraction unit 505. If the candidate pixel is the pixel in the region, it is selected as the next outline pixel. The address of the selected outline pixel is stored in the outline memory 506 as the search address. The next outline pixel is searched based on this address.

The address of the outline pixel is stored and a positional relation information (eg. up, down, left, right) between the immediately previous outline pixel and the newly selected current outline pixel, that is, the connectivity relationship is supplied to the polygonal approximation unit 507.

The polygonal approximation unit 507 polygon-approximates the outline pixel points which are sequentially supplied thereto and outputs end points of the approximation segments as vertex points.

The polygonal approximation processing is done by determining the mutual positional relations among the second, third, . . . outline pixels following to the start point pixel for the approximation, in a manner that the second pixel is, for example, right adjacent to the start point pixel and the third pixel is above the second pixel, and sequentially comparing them with the polygonal approximation data.

As described above, the polygonal approximation data for all possible pixel patterns are previously stored in the polygonal approximation data memory 520. The polygonal approximation data include information which indicates that when the pixels (points) from the first pixel to the N-th pixel (N being smaller than a maximum M) are polygon-approximated, the pixels from the first pixel to the (N+1)th pixel can be approximated by the same segment if the (N+1)th pixel is located rightward or upward of the N-th pixel, but it cannot be approximated by the same segment if the (N+1)th pixel is located leftward or downward of the N-th pixel.

When the outline pixel information is applied from the outline extraction unit 505 to the polygonal approximation unit 507, it determines the serial order of the pixel and the address on the polygonal approximation data memory 520, of the data to be checked next depending on the pattern of the pixels so far inputted, based on the result of the processing for the immediately previous pixel.

For example, when the N-th outline pixel is detected and the information thereof is supplied to the polygonal approximation unit 507, it reads out the polygonal approximation data search address which was determined and stored when the (N−1)th pixel was processed, from the outline memory 506, and reads in the data on the polygonal approximation data memory 520 based on the search address.

This data indicates whether the pixels including the N-th outline pixel can be polygon-approximated or not, and if it can, indicates the start address of the field in which the search address of the (N+1)th outline pixel and the data on the approximation are stored.

When the pixels cannot be polygon-approximated if the N-th outline pixel is included, the pixels up to the (N−1)th pixel is polygon-approximated. The address of the (N−1)th pixel is thus stored in the polygonal approximation information memory 508 as the segment end point (vertex) coordinate. Then, the (N−1)th pixel is again selected as a start point (first pixel) of the next polygonal approximation and the N-th pixel is selected as the second pixel, and the start address of the field in which the search address for the next input outline pixel (third pixel) and the polygonal approximation data are stored is stored in the outline memory 506.

When the pixels including the N-th outline pixel can be polygon-approximated, the start address of the field in which the search address for the next input pixel and the polygonal approximation data are stored is stored in the outline memory 506.

Then, the search address for the next outline pixel is read from the polygonal approximation data memory 520 and it is supplied to the outline extraction unit 505. After the outline extraction unit 505 has confirmed that the polygonal approximation unit 507 completed the processing, the outline extraction unit 505 initiates the processing to search the next outline pixel.

In this manner, the outline pixels of the selected region on the image are searched one by one and the approximation data table is looked up to output the polygonal approximation vertex data. The processing is terminated when the outline extraction unit 505 detects the coincidence of the two consecutively detected outline pixels (S-th outline pixel and (S+1)th outline pixel) with the outline search start pixel and the second outline pixel.

The operations of the outline extraction unit 505 and the polygonal approximation unit 507 are explained in further detail.

Referring to FIG. 11, the outline extraction unit 505 is explained.

The pixel read address generator 606 reads in an address 618 of the immediately previous outline pixel and adds thereto a search address (relative address) 616 supplied from the polygonal approximation unit 507 to produce a pixel read address 619.

The pixel read circuit 601 receives the pixel read address 619 and reads in the corresponding pixel 611 from the image memory 502 and supplies it to the comparator 602.

The comparator 602 compares the pixel 611 with a threshold 612 to produce a binary data 620. The outline pixel discriminator 603 compares the binary data 620 with a region value 613 and supplies an outline pixel flag 617 to the polygonal approximation unit 507, and if the pixel is determined as the outline pixel, it also produces an address registration flag 614. The outline pixel recording circuit 605 responds to the flag 614 to update the address 619 by the outline pixel address 615 and stores it in the outline memory 506.

The region pixel value registration circuit 604 receives a binary data 620 of the first outline pixel of the region and stores a region value 621 in the outline memory 506.

The polygonal approximation unit 507 is now explained with reference to FIG. 12. The outline search address read circuit 701 receives a data search address 711 from the outline memory 506 and reads in a search address (relative address) 712 for searching the next outline pixel, from the polygonal approximation data memory 520, and sends it to the outline extraction unit 505 as address information 716 (616 in FIG. 11) and produces an address update flag 713.

The address updating circuit 702 receives the flag 713 and updates the previously received data search address 711 by the next data search address and supplies the updated address 714 to the outline memory 506.

When a flag 717 (617 in FIG. 11) indicating that a new outline pixel has been detected is supplied from the outline extraction unit 505, the polygonal approximation data read circuit 703 reads out the polygonal approximation data 718 from the polygonal approximation data memory 520 based on the data search address 715.

The discriminator 704 discriminates the data 718, and when it detects the end point of the segment, it sends out an end point processing flag 719. Thus, the end point processing circuit 705 reads in the end point address 720 from the outline memory 506, transforms it to a vertex data 721 of one segment and stores it in the polygonal approximation information memory 508. It also stores the next polygonal approximation data search address 722 in the outline memory 506. If the end point of the segment is not detected, the discriminator 704 produces an address 723 of a field in which the next outline pixel search address data is stored.

In this manner, the outline of the selected region on the image is polygon-approximated and a polygon representation data is produced. Since the tracking of the outline and the polygonal approximation calculation are not carried out each time but the patterned polygonal approximation data are previously stored, the polygonal approximation can be carried out at a high speed by the efficient data retrieval processing.

Through the steps described above, the region to be recognized is extracted from the input image and the region information is represented by segments which are suitable to the subsequent recognition processing and outputted as the polygon vertex coordinate data. The data is stored in the polygonal approximation information memory 108 or 508 and compared with the previously prepared dictionary pattern to determine the matching.

The matching processing is carried out after the two patterns have been positioned such that the characteristic parameters (coordinates of the center of gravity, moment major axis, etc) inherent to the two patterns (polygon patterns) match.

The region (pattern) characteristic extraction processing is performed by the region characteristic extraction unit 110 and the region characteristic memory 111. It is carried out by the steps shown in a region characteristic extraction flow chart of FIG. 13 for each trapezoid defined by normal lines drawn from the opposite ends of the segment to coordinate axes and the coordinate axes.

Vertex coordinates of the approximation segments are represented by $(X_1, Y_1), (X_2, Y_2), ... (X_e, Y_e)$ where $(X_1, Y_1)$ is a start point and $(X_e, Y_e)$ is an end point. The vertex coordinates are arranged in a closed loop on a plane so that $(X_1, Y_1)=(X_e, Y_e)$.

Figure 14:
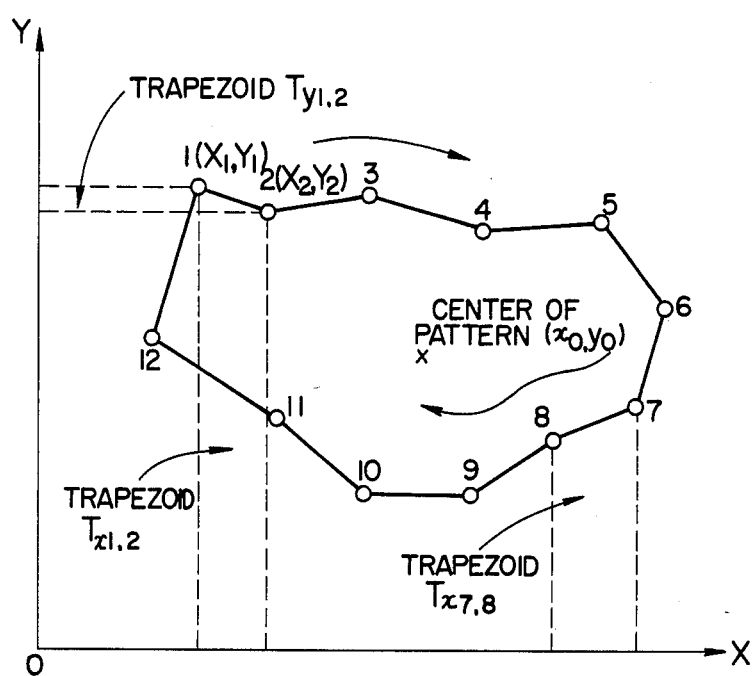
FIG. 14 illustrates a concept of the region characteristic extraction processing.

FIG. 14 illustrates a concept of the region characteristic extraction processing.

Figure 13:
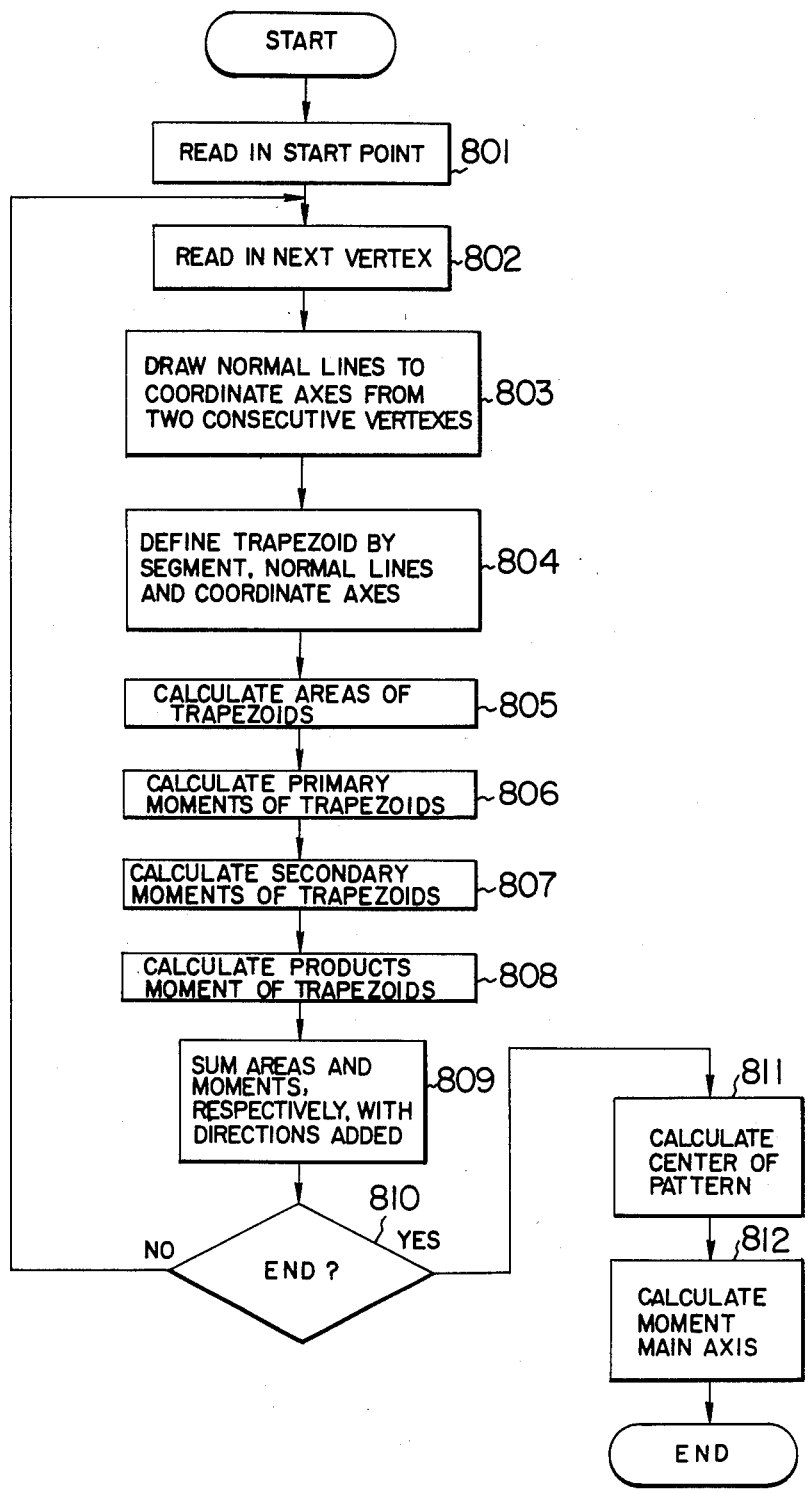
FIG. 13 is a flow chart showing steps of region characteristic extraction processing.

The processing is now explained with reference to the flow chart of FIG. 13.

In a step 801, the region characteristic extraction unit 110 of FIG. 1 reads in the start point $(X_1, Y_1)$ from the polygonal approximation information memory 108. Then, it reads in the next vertex $(X_2, Y_2)$ (step 802), and draws normal lines to an X-coordinate axis and a Y-coordinate axis from two consecutive vertices $(X_1, Y_1)$ and $(X_2, Y_2)$ (step 803). Thus, two trapezoids $T_{S1,2}$ and $T_{Y1,2}$ defined by the segments having the end points at the vertices $(X_1, Y_1)$ and $(X_2, Y_2)$, the normal lines and the coordinate axes are defined (step 804). One trapezoid $T_{S1,2}$ includes the X-coordinate axis as one side and the other $T_{Y1,2}$ includes the Y-coordinate axis as one side.

In the next steps 805–808, areas of the trapezoids, primary moments, secondary moments and a product moment are calculated.

The area of the trapezoid which includes the X-coordinate axis as one side is represented by $$A_{XT} = |\tfrac{1}{2}(X_I - X_{I-1}) \times (Y_{I-1} + Y_I)|$$

where $(X_{I-1}, Y_{I-1})$ and $(X_I, Y_I)$ are coordinates of two consecutive vertices.

Accordingly, by reading in the coordinates of the two consecutive vertices, the areas of the trapezoids are calculated (step 805). For example, by reading in the coordinates $(X_1, Y_1)$ and $(X_2, Y_2)$ of the start point and the next vertex, the area of the trapezoid $T_{X1,2}$ shown in FIG. 14 is calculated.

The primary moments of the trapezoid are represented by $$M_{1XT} = \left| \tfrac{1}{6}(X_I - X_{I-1}) \times (Y_{I-1} + Y_I) \times \{Y_{I-1} + Y_I^2/(Y_{I-1} + Y_I)\} \right|$$

$$M_{1YT} = \left| \tfrac{1}{6}(X_{I-1} + X_I) \times (Y_{I-1} - Y_I) \times \{X_{I-1} + X_I^2/(X_{I-1} + X_I)\} \right|$$

where $M_{1XT}$ and $M_{1YT}$ are primary moments for the X-axis and the Y-axis, respectively, and they are calculated for each trapezoid (step 806).

The secondary moments of the trapezoid are expressed by $$M_{2XT} = \left| \tfrac{1}{12}(X_I - X_{I-1}) \times (Y_{I-1} + Y_I) \times (Y_{I-1}^2 + Y_I^2) \right|$$

$$M_{2YT} = \left| \tfrac{1}{12}(Y_{I-1} - Y_I) \times (X_{I-1} + X_I) \times (X_{I-1}^2 + X_I^2) \right|$$

where $M_{2XT}$ and $M_{2YT}$ are secondary moments for the X-axis and the Y-axis, respectively, and they are calculated in step 807.

The product moment of the trapezoid is expressed by $$M_{XYT} = \left| \tfrac{1}{6}(X_I - X_{I-1}) \times (Y_{I-1} + Y_I) \times \{Y_{I-1} + Y_I^2/(Y_{I-1} + Y_I)\} \times D_{YI} \right|$$

where $D_{YI}=X_{I-1}+\frac{1}{3}(X_I-X_{I-1})+\frac{1}{3}(X_I-X_{I-1})\times y_I/(Y_{I-1}+Y_I)$

[when $X_{I-1} < X_I$]

$D_{YI}=X_I+\frac{1}{3}(X_{I-1}-X_I)+\frac{1}{3}(X_{I-1}-X_I)x$
$y_{I-1}/(Y_{I-1}+Y_I)$

[when $X_{I-1} \geq X_I$]

and it is calculated in a step 808.

The above calculations are carried out for each side of the polygon-approximated pattern in the clockwise direction by sequentially reading in the vertex coordinates and the results are summed (step 809). The summation is carried out with directions added thereto so that an area of the closed loop shown in FIG. 14 is determined. The summation is carried out for each of the coordinates from the start point $(X_1, Y_1)$ to the end point $(X_e, Y_e)$ (step 810). The summation is carried out by the following equations (1) Area of polygonal approximation $$A = \sum_{I=2}^{e} \frac{1}{2}(X_I - X_{I-1}) \times (Y_{I-1} + Y_I)$$

(2) Primary moment $$M_{1X} = \sum_{I=2}^{e} \frac{1}{6}(X_I - X_{I-1}) \times (Y_{I-1} + Y_I) \times \{Y_{I-1} + Y_I^2/(Y_{I-1} + Y_I)\}$$

$$M_{1Y} = \sum_{I=2}^{e} \frac{1}{6}(X_{I-1} + X_I) \times (Y_{I-1} - Y_I) \times \{X_{I-1} + X_I^2/(X_{I-1} + X_I)\}$$

(3) Secondary moment $$M_{2X} = \sum_{I=2}^{e} \frac{1}{12}(X_I - X_{I-1}) \times (Y_{I-1} + Y_I) \times (Y_{I-1}^2 + Y_I^2)$$

$$M_{2Y} = \sum_{I=2}^{e} \frac{1}{12}(Y_{I-1} - Y_I) \times (X_{I-1} + X_I) \times (X_{I-1}^2 + X_I^2)$$

(4) Product moment $M_{XY}$ $$M_{XY} = \sum_{I=2}^{e} \frac{1}{6}(X_I - X_{I-1}) \times (Y_{I-1} + Y_I) \times \{Y_{I-1} + Y_I^2/(Y_{I-1} + Y_I)\} \times D_{YI}$$

where $D_{YI}=X_{I-1}+\frac{1}{3}(X_I-X_{I-1})+\frac{1}{3}(X_I-X_{I-1})x$
$Y_I/(Y_{I-1}+Y_I)$

[when $X_{I-1} < X_I$]

$D_{YI}=X_I+\frac{1}{3}(X_{I-1}-X_I)+\frac{1}{3}(X_{I-1}-X_I)x$
$Y_{I-1}/(Y_{I-1}+Y_I)$

[when $X_{I-1} \geq X_I$]

After the calculations (1)–(4) have been carried out for all of the sides, a center of the polygonal pattern and a moment main axis are calculated by the following equations (steps 811 and 812).

(5) X-coordinate XO and Y-coordinate YO of center of pattern. (Center of gravity)

$XO = M_{1Y}/A$ $YO = M_{1X}/A$ (6) Secondary moments and product moment when coordinate origin is moved parallelly to center of pattern.

$M_{20} = M_{2Y} - M_{1Y} \times M_{1Y}/A$ $M_{02} = M_{2X} - M_{1X} \times M_{1X}/A$ $M_{11} = M_{XY} - M_{1X} \times M_{1Y}/A$ (7) Angle of indication of principal axis of inertia $ANG = \frac{1}{2} \times \tan^{-1}\{2 \times M_{11}/(M_{20} - M_{02})\}$ (8) Secondary moments to principal axis of inertia $$M_{20Z} = \frac{1}{2} \times \left\{ M_{20} + M_{02} + (M_{20} - M_{02}) \times \sqrt{\frac{M_{11}^2}{(M_{20} - M_{02})^2} + 1} \right\}$$

$M_{02Z} = M_{20} + M_{02} - M_{20Z}$

Major axis and minor axis of the principal axis are determined based on $M_{20Z}$ and $M_{02Z}$.

Figure 15:
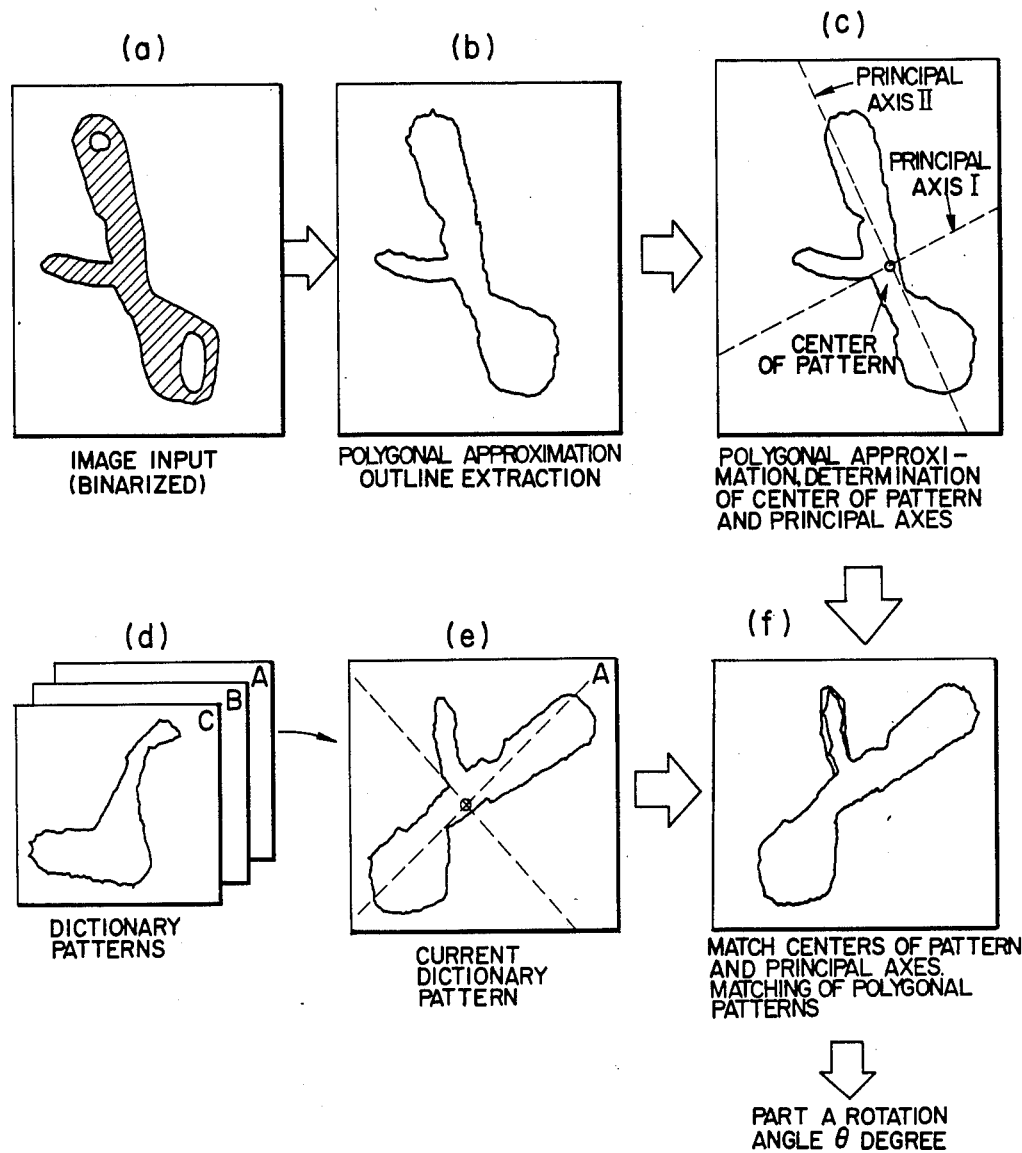
FIG. 15a-f illustrates a pattern matching method.

After the input pattern has been segmented and the center of pattern and the principal axis have been determined, the coordinates of the input pattern are transformed such that the center of pattern and the principal axis match those of the previously registered dictionary pattern, as shown in a pattern matching chart of FIG. 15, and an overlopping region of those patterns is extracted as a polygonal pattern.

If both patterns are derived from the identical part photographed under the some condition, the area of the overlapping region determined in the matching matches the area of the dictionary pattern (input pattern) within an error range determined based on an error in representing an object on a mesh-sectioned digital image and an error due to the polygonal approximation. If a ratio of those areas exceeds a predetermined value (e.g. 95%), the input pattern is determined as a pattern of the object region.

The above processings are performed by the common region extraction unit 112, the common region memory 113, the recognition unit 114, the polygonal approximation information memory 108, the dictionary pattern memory 109 and the region characteristic memory 111.

Figure 16:
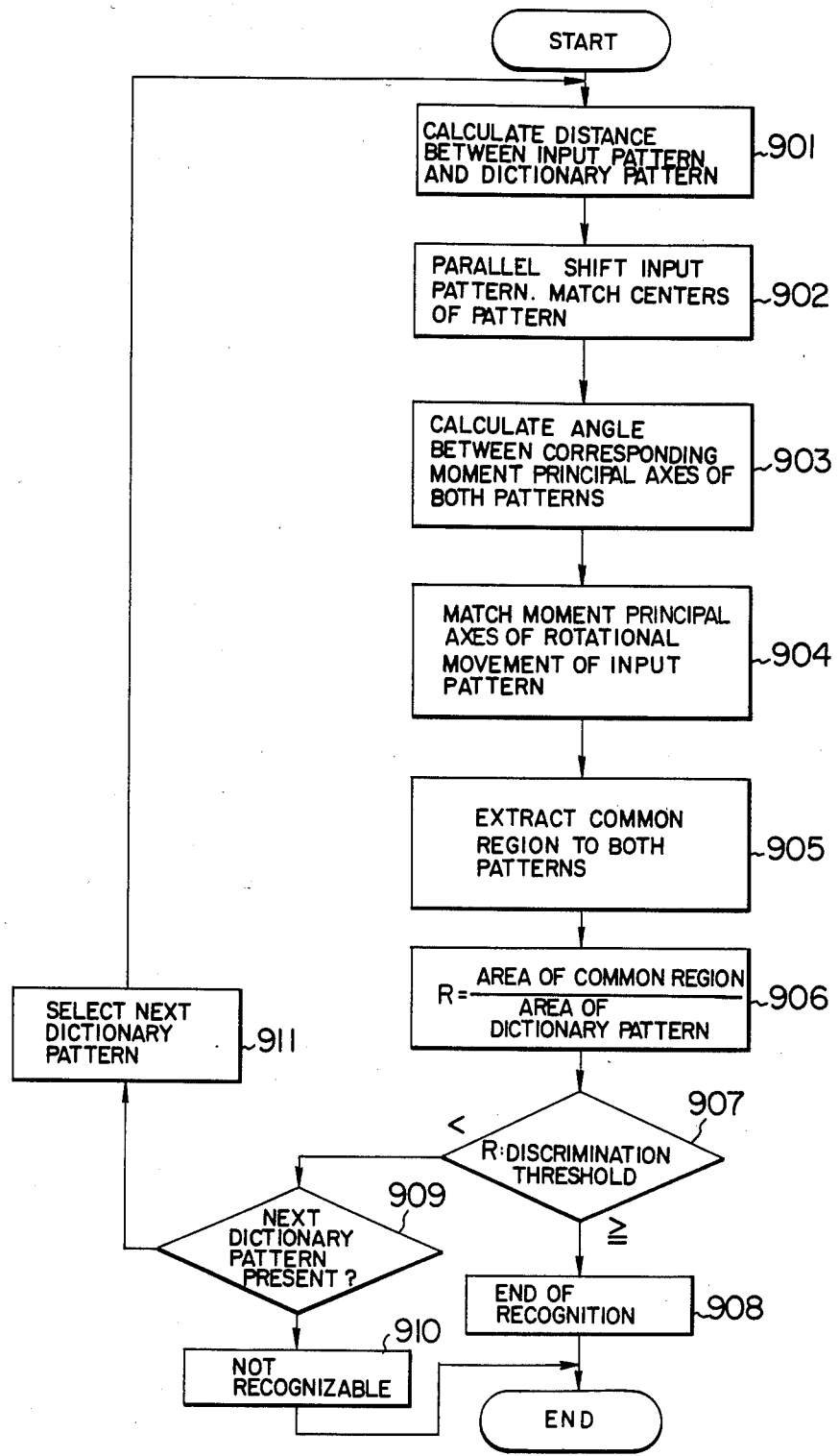
FIG. 16 is a flow chart showing steps of pattern matching processing.

FIG. 16 shows a flow chart of the polygonal pattern matching.

The input pattern having the outline of the region (including an inner outline and an outer outline) segmentally represented by the preprocessing, the outline extraction processing and the polygonal approximation processing is compared with one of the previously registered dictionary patterns to determine the x-direction and y-direction distances between the centers of patterns (step 901).

Then, all vertices of the input pattern are parallelly shifted by the above distances such that the center of the input pattern matches the center of the dictionary pattern (step 902).

Major axes or minor axes of principal axes of both patterns are selected and the principal axes which are approximately equally spaced from the periphery are selected as the corresponding principal axes and an angle between the corresponding principal axes is calculated (step 903).

All vertices of the input pattern are rotated by the above angle around the center of pattern to match the principal axes of both patterns (step 904). A common region to both patterns, that is, a product pattern of the two polygons (which is also a polygon) is determined in a manner to be described later (step 905).

The area of the product pattern is calculated and a ratio thereof to the area of the dictionary pattern (or input pattern) is calculated (step 906).

The area ratio is compared with a predetermined discrimination threshold (step 907), and if the area ratio is larger than the threshold, the matching of the patterns is determined and the end of recognition is indicated, and the position and the attitude information of the input pattern which are calculated based on the type of the matched dictionary pattern and the relative position of the dictionary pattern are outputted (step 908). If the area ratio is smaller than the threshold, the presence of the next dictionary pattern is checked (step 909).

If the matching processing for all dictionary patterns has been completed and the next dictionary pattern is not present, a message of not recognizable is outputted and the processing is terminated (step 910). If the next dictionary pattern is present, it is selected (step 911) and the matching processing is repeated from the first.

The processing for forming the product pattern (common region) of the polygonal pattern and the dictionary pattern is explained below.

In order for a point P(X, Y) on a two-dimensional plane to be on a right half plane of a segment $P_1P_2$, it is necessary that the following equation is positive.

$$f_{12}(p) = - \begin{vmatrix} X & Y & 1 \\ X_1 & Y_1 & 1 \\ X_2 & Y_2 & 1 \end{vmatrix}$$

where $P_1 = (X_1, Y_1)$ and $P_2 = (X_2, Y_2)$ considering a function $$g_{12}(P) = \begin{cases} 1 & [f_{12}(P) > 0] \\ 0 & [f_{12}(P) = 0] \\ -1 & [f_{12}(P) < 0] \end{cases}$$

a condition for segments $P_1P_2$ and $P_3P_4$ to cross is given by $$\begin{cases} g_{12}(P_3) = -g_{12}(P_4) \\ g_{34}(P_1) = -g_{34}(P_2) \end{cases}$$

In order to check the presence or absence of crosspoints polygons F and F' are considered, and a VS matrix and SV matrix for determining whether vertices are on the right side or left side of the segments are defined.

$$\begin{cases} VS(i,j) = g_{i,i+1}(P_j) \\ SV(i,j) = g_{j,j+1}(P_i) \end{cases}$$

From the above relations, the crossing of the segments is determined in accordance with the following equation $$C_{ij} | \{SV(i,j) - SV(i,j+1)\} \times \{VS(i+1,j) - VS(i,j)\} |$$

A condition for the determination is as follows.

$$C_{ij} = \begin{cases} 4: [P_i P_{i+1}] \text{ and } [P_j P_{j+1}) \text{ cross.} \\ 2: \text{ a vertex overlaps to a segment.} \\ 1: \text{ a vertex overlaps to other vertex.} \\ 0: \text{ no crossing.} \end{cases}$$

The presence or absence of the vertex of the product pattern is determined in accordance with the above determination equation, and if the presence of the vertex is detected, the vertex is determined by a crosspoint calculation for two lines. The product pattern is represented by the vertex coordinates as is the polygonal model, and the area of the polygon is calculated and the pattern matching is evaluated in accordance with the following equation.

$$\text{Pattern matching} = \frac{\text{Area of product pattern}}{\text{Area of standard pattern}} \times 100 \ (\%)$$

The present embodiment does not need a large scale separate hardware to attain the same precision of recognition and processes only the vertex data. Accordingly, it attains a high processing speed.

Since the polygonal approximation is used, an affect to the precision of recognition should be examined. According to a recognition experiment, a position precision to the center of gravity is approximately 0.2 pixel and a calculation precision to the moment principal axis is approximately 0.015 radian.

As described hereinabove, according to the present invention, the pattern recognition apparatus which attains the high processing speed without increasing the amount of pattern matching processing for the object whose outline includes the attitude rotation is provided. Accordingly, the recognizing the type, the position and the attitude of the object, the performance, the reliability and the efficiency of the robot, the automatic assembling machine and the external view inspection machine can be remarkably improved.

We claim:

1. A pattern recognition apparatus, comprising:
   (a) means for identifying an object region of an object from input image data;
   (b) means for extracting outline pixels of the identified object region;
   (c) means for polygonally-approximating an outline of said object region based on a positional relationship of the extracted outline pixels and for determining vertex coordinates of a polygonal approximation of the outline of the identified object region;

said vertex coordinate determination means including:

a polygonal approximation data memory for storing pixel pattern data which can be approximated as lines of a polygonal approximation of the outline from the input image data;

means for determining end points of segments of the outline by referring to the pixel pattern data stored in said polygonal approximation data memory based on connectivity among the extracted outline pixels, and for sequentially segmenting said outline into the segments; and a vertex data memory for storing data about the end points of the segments to provide end point data as the polygonally-approximated vertex coordinates;

(d) means for determining characteristic data representing the center and the orientation of said polygonally-approximated region based on said vertex coordinates; and (e) means for superimposing a polygonally-approximated region pattern on a dictionary pattern based on said characteristic data to generate a common region by matching the center of said polygonally-approximated region pattern with the center of said dictionary pattern and transforming the vertex coordinates of said polygonally-aproximated region pattern on the basis of any angular difference between the orientation of the polygonally approximated region pattern and orientation of said dictionary pattern to provide a transformed region pattern, and for determining a degree of matching between the transformed region pattern and the dictionary pattern.

2. A pattern recognition apparatus according to claim 1 wherein said identifying means (a) includes:

input control means for binarizing said input image data by predetermined threshold;

an image memory for storing said binarized image data;

processing means for identifying the object region based on the image data stored in said image memory and simultaneously determining position information of a representative point of said region; and a region information memory for storing said position information of said representative point.

3. A pattern recognition apparatus according to claim 2, wherein said outline pixel extracting means includes:

outline extracting means for determining a start point of scan based on said position information of said representative point, sequentially scanning the outline pixels of the object region on the image and determining center coordinates of said outline pixels; and an outline memory for storing said center coordinates.

4. A pattern recognition apparatus according to claim 3, wherein said vertex coordinate determination means includes:

polygonal approximation means for polygonally-approximating the sequence of said center coordinates within a predetermined allowable error range, to polygonally-approximate said object region and sequentially determine the vertex coordinates; and a polygonal approximation information memory for storing said vertex coordinates.

5. A pattern recognition apparatus according to claim 4, wherein said characteristic data determination means includes:

region characteristic extraction means for extracting region characteristic data including said center and orientation of said polygonally-approximated object region from the content of said polygonal-approximation information memory; and a region characteristic memory for storing said region characteristic data.

6. A pattern recognition apparatus according to claim 5, wherein said matching determination means includes;

common region extraction means for superimposing said object region pattern on said dictionary pattern by transforming the coordinates thereof based on the center and orientation data of said polygonally-approximated region in said characteristic data to determine a common region of said patterns as a sequence of vertex coordinates;

a common region memory for storing the sequence of vertex coordinates of said common region and recognition means for calculating an area of said common region based on the vertex coordinates stored in said common region memory, calculating a ratio of said common region area to an area of one of said patterns, and determining the matching of said patterns when said ratio is larger than a predetermined value.

7. A patten recognition apparatus according to claim 3, wherein said vertex coordinate determination means includes:

a polygonal approximation data memory for storing polygonal approximation data for a point pattern to polygonally-approximate the outline pixels of the input image data;

means for determining end points of segments by referring to the polygonal approximation data stored in said polygonal approximation data memory based on connectivity among the extracted outline pixels, and sequentially segmenting said outline pixels; and a vertex data memory for storing data about the end points of the polygonal approximation to provide said end point data as the polygonally-approximated vertex data.

8. A pattern recognition apparatus according to claim 1 wherein said outline pixel extracting means (b) includes:

outline extracting means for determining a start point of scan based on position information of a representative point of said region, sequentially scanning the outline pixels of the object region on the image and determining center coordinates of said outline pixels; and an outline memory for storing said center coordinates.

9. A pattern recognition apparatus according to claim 1 wherein said vertex coordinate determination means (c) includes:

polygonal approximation means for polygon-approximating the sequence of center coordinates of said outline pixels within a predetermined allowable error range, to polygonally-approximate said object region and sequentially determining the vertex coordinates; and a polygonal approximation information memory for storing said vertex coordinates.

10. A pattern recognition appartus according to claim 1 wherein said characteristic data determination means (d) includes:
   region characteristic extraction means for extracting regio characteristic data including said center and orientation of said polygonally-approximated object region from said vertex coordinates; and
   a region characteristic memory for storing said region characteristic data.

11. A pattern recognition apparatus according to claim 1, wherein said matching determination means (e) includes:
   common region extraction means for superimposing said object region pattern on said dictionary pattern to determine the common region between said transformed region and dictionary patterns as a sequence of vertex coordinates;
   a common region memory for storing the sequence of vertex coordinates of said common region; and
   recognition means for calculating an area of said common region based on the vertex coordinates stored in said common region memory, calculating a ratio of said common region area to an area of one of said patterns, and determining said degree of matching of said patterns when said ratio is larger than a predetermined value.

12. A pattern recognition apparatus according to claim 1 wherein said matching determination means (e) includes means for identifying the position and the attitude of the polygonally-approximately region from relative position information about said patterns.

13. A pattern recognition apparatus, comprising:
   (a) preprocessing means for binarizing input image data, identifying an object region based on said data and concurrently determining position information of a representative point of said region;
   (b) outline extraction means for sequentially searching outline pixels of said object region based on said position information of said representative point to extract the outline pixels;
   (c) polygonal approximation means for polygonally-approximating an outline of said object region based on position relationship of said outline pixels by referring to a table of a pattern series capable of approximation of lines and storing vertex coordinates of the polygonally-approximated region in a memory;
   (d) region characteristic extraction means for extracting region characteristic data about the center and the orientation of said polygonally-approximated region from said vertex coordinates and storing the region characteristic data in a memory; and
   (e) pattern matching means for superimposing a polygonally-approximated pattern associated with the content stored by said polygonal approximation means and said region characteristic extraction means on a previously prepared dictionary pattern to generate a common region by matching the center of said polygonally-approximated region pattern with the center of said dictionary pattern and transforming the vertex coordinates of said polygonally-approximated region pattern on the basis of any angular difference between the orientation of the polygonally approximated region pattern and orientation of said dictionary pattern to provide a transformed region pattern, and extracting a common region common to both the transformed region pattern and the dictionary pattern, and dictionary patterns when an area of said common region is larger than a predetermined area.

14. A pattern recognition apparatus according to claim 13 wherein said preprocessing means (a) includes:
   input control means for binarizing said input image data by a predetermined threshold;
   an image memory for storing said binarized image data;
   processing means for identifying the object region based on the image data stored in said image memory and simultaneously determining position information of a representative point of said region; and
   a region information memory for storing said position information of said representative point.

15. A pattern recognition apparatus according to claim 14 wherein said outline extracting means (b) includes:
   outline extracting means for determining a start point of scan based on said position information of said representative point, sequentially scanning the outline pixels of the object region on the image and determining center coordinates of said outline pixels; and
   an outline memory for storing said center coordinates.

16. A pattern recognition apparatus according to claim 15 wherein said polygonal approximation means (c) includes:
   polygonal approximation means for polygon-approximating the sequence of said center coordinates within a predetermined allowable error range, to polygon-approximate said object region and sequentially determining the vertex coordinates; and
   a polygonal approximation information memory for storing said vertex coordinates.

17. A pattern recognition apparatus according to claim 16 wherin said region characteristic extraction means (d) includes:
   region characteristic extraction means for extracting region characteristic data including said center and orientation of said polygonally-approximately object region from the content of said polygonal approximation information memory; and
   a region characteristic memory for storing said region characteristic data.

18. A pattern recognition apparatus according to claim 13 wherein said pattern matching means (e) includes:
   common region extraction means for superimposing said pattern on said dictionary pattern by transforming the coordinates thereof based on the center and the orientation data of said polygonally-approximated region in said characteristic data to determine the common region of said patterns as a sequence of vertex coordinates;
   a common region memory for storing the sequence of vertex coordinates of said common region; and
   recognition means for calculating an area of said common region based on the vertex coordinates stored in said common region memory, calculating a ratio of said common region area to an area of one of said patterns, and determining the matching of said patterns when said ratio is larger than a predetermined value.

19. A pattern recognition apparatus according to claim 13 wherein said pattern matching means (e) includes means for identifying the center and orientation of the object from relative position information of said patterns.

20. A pattern recognition apparatus according to claim 13 wherein said polygonal approximation means (c) includes:
- a polygonal approximation data memory for storing polygonal approximation data for a point pattern required to polygonally-approximate the outline pixels of the digital image;
- means for determining end points of segments by referring to the polygonal approximation data stored in said polygonal approximation data memory based on connectivity among the extracted outline pixels, and sequentially segmenting said outline pixels; and
- a vertex data memory for storing the end point data of the polygonal approximation to output said end point data as the polygon-approximated vertex data.

21. A pattern recognition apparatus, comprising:
(a) preprocessing means for binarizing input image data, identifying an object region from said data and concurrently determining position information of a representative point of said region;
(b) outline extraction means for sequentially searching outline pixels of said object region based on said position information of said representative point and determining center coordinates of said outline pixels;
(c) polygonal approximation means for polygonally-approximating said object region based on said center coordinates by referring to a table of a pattern series capable of approximation of lines and storing vertex coordinates in a dictionary pattern memory when said input image data relates to a dictionary pattern and otherwise storing said vertex coordinates in a polygonal approximation information memory;
(d) region characteristic extraction means for extracting characteristic data about the center and the orientation of said polygonally-approximated object region from said vertex coordinates and storing the region characteristic data in said dictionary pattern memory when said input image data relates to said dictionary pattern and otherwise storing said region characteristic data in a region characteristic memory; and
(e) pattern matching means for positioning a polygonally-approximated pattern associated with the contents stored in said polygonal approximation information memory and the region characteristic memory and a polygonal dictionary pattern associated with the content of said dictionary pattern memory previously prepared based on said region characteristic data with respect to the center and the orientation to superimpose the polygonally-approximated and polygonal dictionary patterns to generate a common region by matching the center of said polygonally-approximated pattern with the center of said polygonal dictionary pattern and transforming the vertex coordinates of said polygonally-approximated pattern of the basis of any angular difference between the orientation of the polygonally approximated pattern and orientation of said polygonal dictionary pattern to provide a transformed region pattern and extracting a common region common to both the transformed region and the polygonal dictionary patterns when a ratio of an area of said common region to an area of said dictionary patterns is larger predetermined value.

22. A pattern recognition apparatus according to claim 21 wherein said polygonal approximation means includes:
- a polygonal approximation data memory for storing polygonal approximation data on a point pattern required to polygonally-approximate the outline pixels of the digital image;
- means for sequentially segmenting the outline pixels of said object region by referring to the polygonal approximation data stored in said polygonal approximation data memory based on the connectivity of said center coordinates to polygon-approximate said outline pixels and determining end points of segments of the polygon;
- a polygonal approximation information memory for storing the end point data of said segments as vertex coordinates of the approximation polygon; and
- a dictionary pattern memory for storing the content stored in said polygonal approximation information memory when said input image data relates to said dictionary pattern.

23. A pattern recognition apparatus, comprising:
(a) input control means for binarizing input image data by a predetermined threshold;
(b) an image memory for storing said binarized image data;
(c) preprocessing means for identifying an object region from the image data stored in said image memory and concurrently determining position information of a representative point of said region;
(d) a region information memory for storing the position information of said representative point;
(e) outline extraction means for determining a start point of search based on the position information of said representative point, sequentially searching outline pixels of the object region on the image and determining center coordinates of said outline pixels;
(f) an outline memory for storing said center coordinates;
(g) polygonal approximation means for polygonally-approximating the points of said center coordinates within a predetermined allowable error range to polygonally-approximate said object region and thereby provide a polygonal-approximated object region by referring to a table of a pattern series capable of effecting approximation of lines, and sequentially determining vertex coordinates of the polygonally-approximated object region;
(h) a polygonal approximation information memory for storing said vertex coordinates;
(i) region characteristic extraction means for extracting region characteristic data including center information and orientation information about said polygonally-approximated object region from the content of said polygonal approximation information memory;
(j) a region characteristic memory for storing the region characteristic data;
(k) a dictionary pattern memory for storing said vertex coordinates and said region characteristic data when said input image data relates to a dictionary pattern;
(l) common region extraction means for superimposing the polygonal pattern stored in said polygonal approximation information memory on said dictionary pattern stored in said dictionary pattern memory based on the region characteristic data stored in said region characteristic memory and said dictionary pattern memory by transforming the vertex coordinates of said polygonal pattern so that selected axes of both patterns match and determining a common region of both patterns as a sequence of vertex coordinates;

(m) a common region memory for storing the vertex coordinates of said common region; and (n) recognition means for calculating an area of said common region based on the vertex coordinates stored in said common region memory, determining a ratio of said area to an area of said dictionary pattern or said polygonal pattern and determining the degree of matching of the patterns when said ratio is larger than a predetermined value.

24. A pattern recognition apparatus according to claim 23 wherein said approximation means includes a polygonal approximation data memory for storing polygonal approximation data on the point pattern required to polygonally-approximate the outline pixels of the digital image.

25. A pattern recognition apparatus according to claim 23 wherein said recognition means includes means for calculating a relative position of said polygonal pattern and said dictionary pattern to recognize the center and orientation of said object based on the relative position information.

26. A pattern recognition method, comprising:
(a) a first step for recognizing blobs of the same value, starting points of contours of the blobs, and relations between blobs,
(b) a second step for analyzing inside-outside relations between blobs and an expression of these relations,
(c) a third step for expressing the contours of the blobs by segmented lines according to a look-up table which describes potential mesh patterns to be transformed to a line, (d) a fourth step for calculating x-y coordinates of a center of the object, and a direction of the main axis of secondary moment of the object,
(e) a fifth step for placing a target pattern derived from the object onto a standard pattern by matching the coordinates of the center of said target pattern with coordinates of the center of said standard pattern and transforming vertex coordinates of said segmented lines describing the target pattern on the basis of any angular difference between the direction of said main axis of secondary moment of the object and thereby generating an overlapped polygon, and
(f) a sixth step for identifying a part and its position and orientation by a ratio of the overlapped area to an initial area.

* * * * *